United States Patent
Vetters et al.

(10) Patent No.: US 10,030,541 B2
(45) Date of Patent: Jul. 24, 2018

(54) TURBINE SHROUD WITH CLAMPED FLANGE ATTACHMENT

(71) Applicants: Rolls-Royce North American Technologies, Inc., Indianapolis, IN (US); Rolls-Royce High Temperature Composites, Inc., Huntington Beach, CA (US)

(72) Inventors: Daniel K. Vetters, Indianapolis, IN (US); Todd Engel, Long Beach, CA (US); Robert J. Shinavski, Mission Viejo, CA (US)

(73) Assignees: Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 434 days.

(21) Appl. No.: 14/789,284

(22) Filed: Jul. 1, 2015

(65) Prior Publication Data
US 2017/0002674 A1    Jan. 5, 2017

(51) Int. Cl.
*F01D 25/24* (2006.01)
(52) U.S. Cl.
CPC ........ *F01D 25/246* (2013.01); *F05D 2240/11* (2013.01); *F05D 2250/13* (2013.01); *F05D 2250/23* (2013.01); *F05D 2300/6033* (2013.01); *Y02T 50/672* (2013.01)
(58) Field of Classification Search
CPC ...... F01D 25/246; F01D 25/28; F01D 25/243; F01D 25/26; F01D 11/08; F05D 2300/6033; F05D 2250/23; F05D 2250/13; F05D 2240/11
See application file for complete search history.

(56) References Cited

U.S. PATENT DOCUMENTS

| | | | | |
|---|---|---|---|---|
| 4,728,257 A | * | 3/1988 | Handschuh | F01D 11/24 415/136 |
| 5,271,714 A | * | 12/1993 | Shepherd | F01D 25/246 415/189 |
| 5,387,082 A | * | 2/1995 | Matyscak | F01D 11/005 415/139 |
| 6,702,550 B2 | | 3/2004 | Darkins, Jr. et al. | |
| 6,733,235 B2 | * | 5/2004 | Alford | F01D 11/08 415/173.1 |
| 6,821,085 B2 | * | 11/2004 | Darkins, Jr. | F01D 11/08 415/116 |
| 7,052,235 B2 | | 5/2006 | Alford et al. | |
| 7,278,820 B2 | | 10/2007 | Keller | |

(Continued)

OTHER PUBLICATIONS

Corman, Gregory S., Luthra, Krishan L.: Melt Infiltrated Ceramic Composites (Hipercomp) for Gas Turbine Engine Applications, Continuous Fiber Ceramic Composites Program Phase II Final Report for the Period May 1994-Sep. 2005, 507 pages.

(Continued)

*Primary Examiner* — Eldon Brockman
(74) *Attorney, Agent, or Firm* — Barnes & Thornburg LLP

(57) ABSTRACT

A turbine engine including a turbine shroud for positioning radially outside of blades of the turbine rotor. The turbine shroud includes a carrier, a retention assembly, and a blade track. The blade track is clamped by the retention assembly, and the retention assembly is supported by the carrier.

11 Claims, 4 Drawing Sheets

(56) References Cited

U.S. PATENT DOCUMENTS

| | | | |
|---|---|---|---|
| 7,556,475 B2* | 7/2009 | Roberts, III | F01D 11/08 29/889.2 |
| 7,726,936 B2* | 6/2010 | Keller | F01D 11/12 415/173.4 |
| 7,950,234 B2* | 5/2011 | Radonovich | F01D 11/122 415/173.1 |
| 8,061,977 B2 | 11/2011 | Keller et al. | |
| 8,347,636 B2 | 1/2013 | Butkiewicz et al. | |
| 2003/0185674 A1* | 10/2003 | Alford | F01D 11/08 415/173.1 |
| 2013/0136582 A1 | 5/2013 | Mizokami et al. | |
| 2014/0030072 A1 | 1/2014 | Hillier et al. | |
| 2015/0003958 A1 | 1/2015 | Uskert et al. | |
| 2015/0044049 A1 | 2/2015 | Lamusga et al. | |
| 2016/0258304 A1* | 9/2016 | Sippel | F01D 25/246 |
| 2016/0333715 A1* | 11/2016 | McCaffrey | F01D 25/246 |

OTHER PUBLICATIONS

Corman, Gregory S., Luthra, Krishan L.: Melt Infiltrated Ceramic Matrix Composites for Shrouds and Combustor Liners of Advanced Industrial Gas Turbines, Advance Materials for Advanced Industrial Gas Turbines (AMAIGT) Program Final Report for the Period Jul. 1, 2000-Sep. 30, 2010, 511 pages.

* cited by examiner

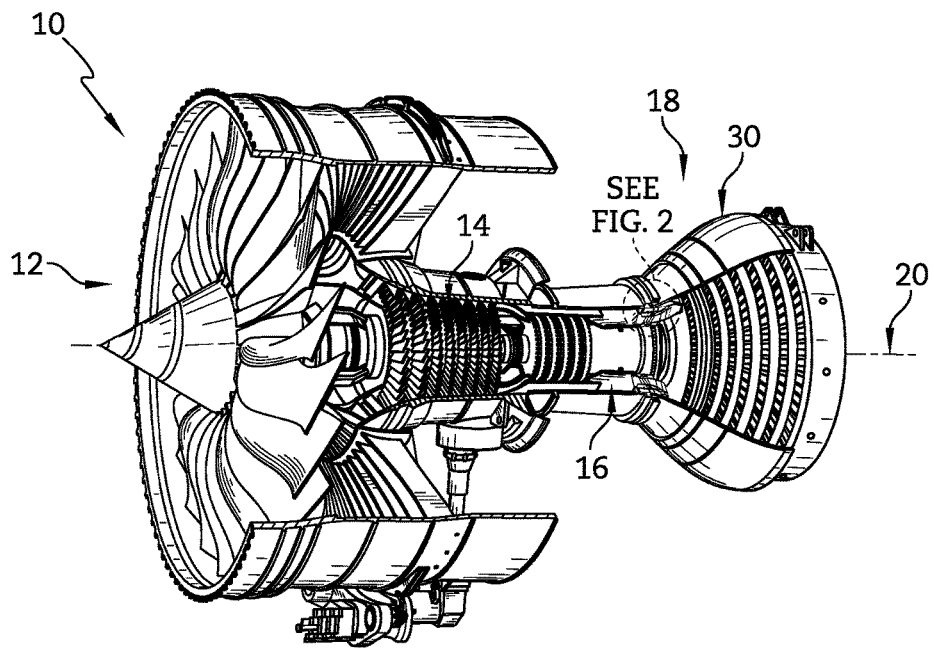
FIG. 1
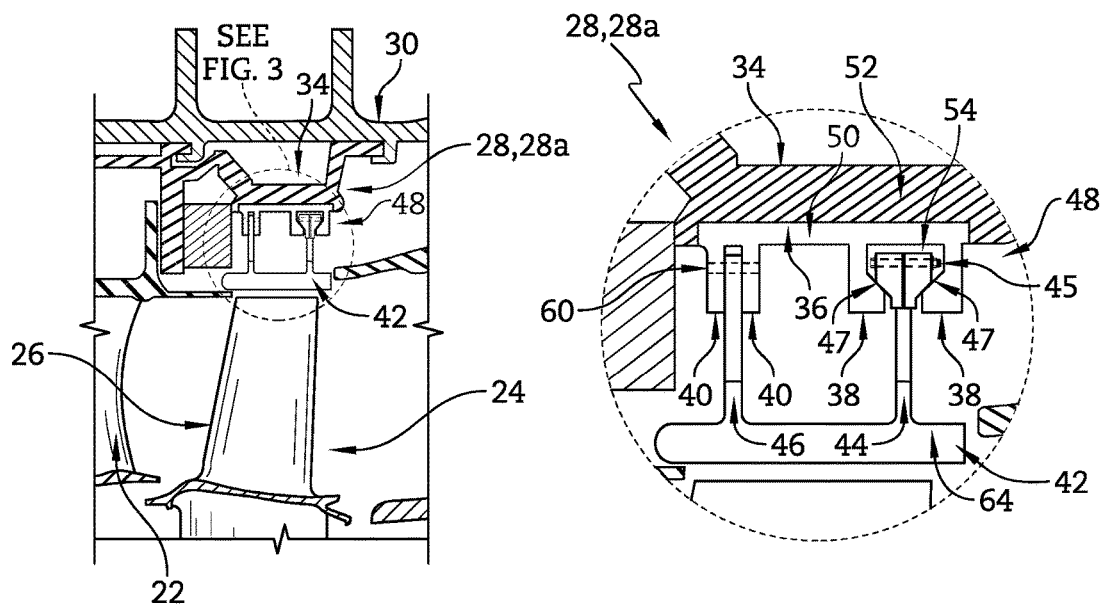
FIG. 2
FIG. 3

TURBINE SHROUD WITH CLAMPED FLANGE ATTACHMENT

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Exhaust products of the combustion are exhausted out of the turbine and may provide thrust in some applications.

Compressors and turbines typically include alternating stages of static vane assemblies and rotating wheel assemblies. The rotating wheel assemblies include disks having blades around their outer edges. When the rotating wheel assemblies turn, tips of the blades move along blade tracks of static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Blade tracks of such shrouds block gases from leaking through the shroud during operation of the gas turbine engine. Thus, more gases are forced to pass over the blades of the rotating wheel assemblies that extract work from the gases.

SUMMARY

The present disclosure may comprise one or more of the following features and combinations thereof.

According to one aspect of the disclosure a segmented turbine shroud extends around a central axis and includes a carrier segment formed to include a dovetail slot that opens inwardly in a radial direction toward the central axis. The turbine shroud includes a blade track segment comprising ceramic-containing materials, the blade track segment being formed to include a runner that extends partway around the central axis and a flange that extends radially outward from the runner, and a track retention assembly including retainer blocks that receive at least a portion of the flange included in the blade track segment. The retainer blocks are positioned in the dovetail slot of the carrier segment and cooperate to provide a dovetail shape corresponding to the dovetail slot and being sized to block movement of the track retention assembly out of the dovetail slot.

In some embodiments, at least one of the retainer blocks is formed to include a recess that receives at least a portion of the flange of the blade track segment. In some embodiments, the flange from one side to another side has a constant cross-sectional thickness at each point along a length of the flange that extends radially outward from the runner.

In some embodiments, the recess is formed to match at least a portion of a profile created by the flange. In some embodiments, the recess is formed to match the cross-sectional thickness of the flange.

In some embodiments, the turbine shroud further includes a pin positioned to extend through the retainer blocks. In some embodiments, the pin is positioned to extend through the flange. In some embodiments, the pin extends through radially-elongated apertures formed in the retainer blocks sized to allow movement of the pin in the radial direction.

In some embodiments, the at least two retainer blocks are clamped to the flange by a clamp-load device. In some embodiments, the clamp-load device is a threaded fastener that extends through the retainer blocks.

In some embodiments, the blade track segment includes another flange positioned to be received by at least two other retainer blocks included in the track retention assembly.

According another aspect of the disclosure, a turbine shroud segment includes a carrier formed to include a dovetail slot, a blade track comprising ceramic-containing materials, the blade track segment formed to include a runner and a flange that extends radially outward from the runner, and a track retention assembly including two retainer blocks that receive at least a portion of the flange of the blade track, the retainer blocks being positioned in the dovetail slot of the carrier, and that cooperate to provide a dovetail shape corresponding to the dovetail slot and being sized to block radial movement of the track retention assembly radially out of the dovetail slot, and each retainer block includes an exterior surface configured to engage with a surface of the dovetail slot of the carrier, and an interior surface configured to engage an exterior surface of the flange.

In some embodiments, the exterior surface of at least one of the retainer blocks faces towards the runner of the blade track and at least one of the interior surfaces of the retainer block faces away from the runner of the blade track.

In some embodiments, the exterior surface of the at least one retainer block is slanted to define a rise and a run, and the interior surface of the at least one retainer block is slanted to define a rise and a run, and a direction of the run of the exterior surface of the at least one retainer block is perpendicular to the a direction of the run of the interior surface of the at least one retainer block.

According to another aspect of the disclosure, a method of assembly of a segmented turbine shroud that extends around a central axis, includes providing a carrier segment formed to include a dovetail slot that opens inwardly in a radial direction toward the central axis, providing a blade track segment comprising ceramic-containing materials, the blade track segment formed to include a runner that extends partway around the central axis and a flange that extends radially outward from the runner, and providing a track retention assembly including positioning two retainer blocks thereof to receive at least a portion of the flange included in the blade track segment, and positioning the two retainer blocks into the dovetail slot of the carrier segment to cooperate to provide a dovetail shape corresponding to the dovetail slot sized to block radial movement of the track retention assembly radially out of the dovetail slot.

In some embodiments, each retainer block includes an exterior surface configured to engage with a surface of the dovetail slot of the carrier, and an interior surface configured to engage an exterior surface of the flange, and the exterior surface is slanted to define a slope having a rise and a run, and the interior surface is slanted to define a slope having a rise and a run, and a direction of the run of the slope of the exterior surface is perpendicular to the a direction of the run of the slope of the interior surface.

According to another aspect of the disclosure a segmented turbine shroud that extends around a central axis includes a carrier segment formed to include a body and an arm extending radially inward from the body, a blade track segment comprising ceramic-containing materials, the blade track segment formed to include a runner that extends partway around the central axis and a flange that extends radially outward from the runner, and a track retention assembly including a retainer block configured to receive at least a portion of the flange of the blade track segment, and the arm is configured to receive at least a portion of the flange and the arm and the retainer block together receive the flange to provide clamped attachment of the blade track to the carrier segment.

These and other features of the present disclosure will become more apparent from the following description of the illustrative embodiments.

BRIEF DESCRIPTION OF THE DRAWINGS

FIG. 1 is a partial perspective view of gas turbine assembly according to the present disclosure with a portion cut away showing that the assembly includes a fan, a compressor, and a turbine;

FIG. 2 is a cross-sectional view of a portion of the turbine shown in FIG. 1 showing that the turbine includes a turbine shroud positioned radially inward of a casing and radially outward of the rotor and blades and having a carrier and a blade track;

FIG. 3 is a detailed cross-sectional view of illustrative embodiments of the portion of FIG. 2 showing that the carrier is formed to include a dovetail slot on the right side, and that the blade track includes a runner and a flange on the right side, and that a track retention assembly on the right side includes retention blocks that receive the flange and block the flange from movement out of the dovetail slot;

DETAILED DESCRIPTION OF THE DRAWINGS

Figure 4:
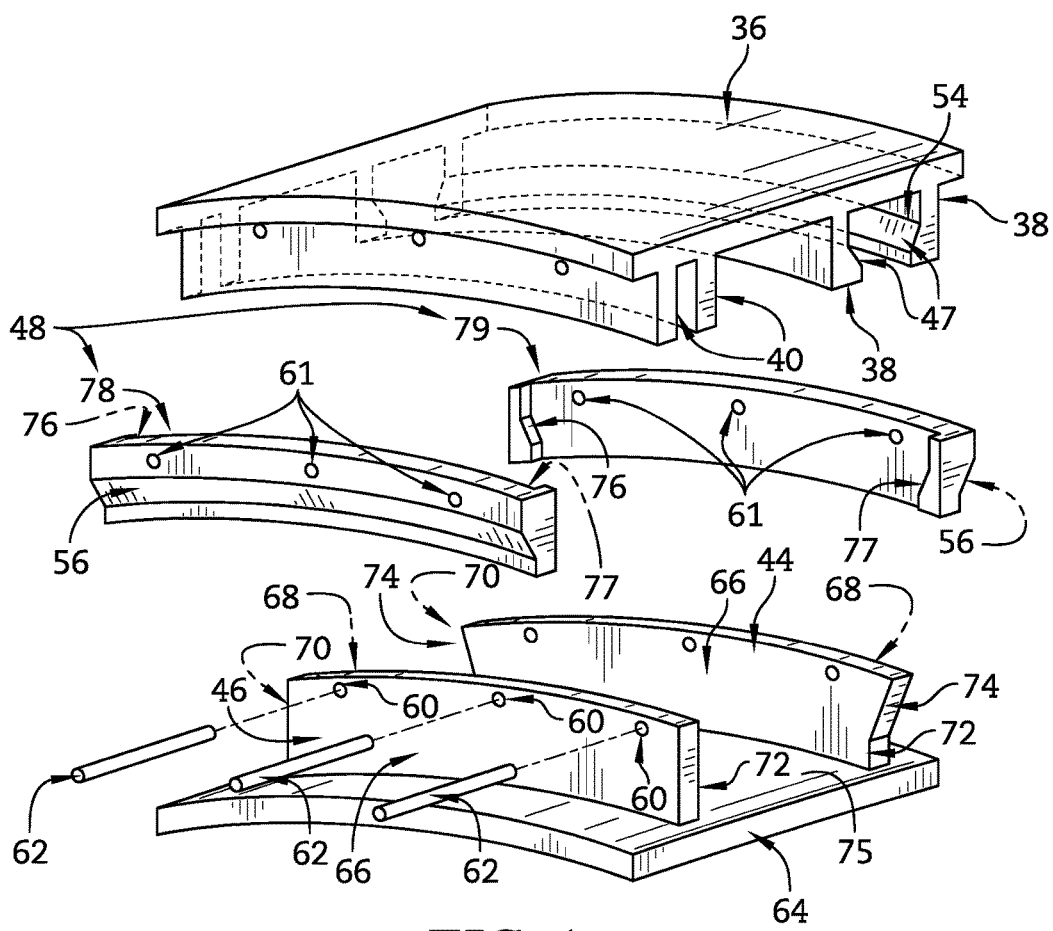
FIG. 4 is an exploded perspective view of illustrative embodiments of FIG. 3 showing that the runner includes the flange on the right side and another flange on the left side, and the track retention assembly includes two retainer blocks that receive a portion of the flange on the right side, and that the carrier has a pinned connection with the other flange of the runner on the left side.

For the purposes of promoting an understanding of the principles of the disclosure, reference will now be made to a number of illustrative embodiments illustrated in the drawings and specific language will be used to describe the same.

An illustrative gas turbine engine 10 with a portion cut away is shown in FIG. 1 to illustrate that the engine 10 includes a fan 12, a compressor 14, a combustor 16, and a turbine 18. The fan 12 is driven by the turbine 18 and provides thrust for driving a load (not shown), for example propulsion of an air vehicle. The compressor 14 compresses and delivers air to the combustor 16. The combustor 16 mixes fuel with the compressed air from the compressor 14 and combusts the mixture. The hot, high-pressure exhaust products of the combustion reaction in the combustor 16 are directed into the turbine 18 to cause the turbine 18 to rotate about an axis 20 and drive the compressor 14 and the fan 12.

Referring now to FIG. 2, a portion of the turbine 18 is shown to include static turbine vane assembly 22 and a turbine wheel assembly 24. The vane assembly 22 extends across the flow path of the hot, high-pressure exhaust products from the combustor 16 to direct the exhaust toward blades 26 of the turbine wheel assembly 24. The flow of combustion exhaust applies force to the blades 26 to cause the turbine wheel assembly 24 to rotate, thereby driving the rotating components of the compressor 14 and the fan 12.

The turbine 18 also includes a turbine shroud 28 that extends around the turbine wheel assembly 24 to encourage combustion exhaust to flow in a manner that applies force to the blades 26 as shown in FIGS. 2 and 3. Combustion exhaust that passes over the blades 26 does not apply force to the blades 26 and such pass-over exhaust creates operational performance loss. Turbine shroud 28 is illustratively comprised of a plurality of turbine shroud segments 28a arranged within a casing 30 to form an annular ring as suggested in FIG. 1.

The turbine shroud 28 includes a carrier 34, a blade track 42, and a track retention assembly 48, as shown in FIGS. 2 and 3. The carrier 34 comprises a metallic material and provides a dovetail slot 54 for supporting the blade track 42 relative to the casing. The blade track 42 illustratively comprises a ceramic matrix material and directly surrounds the turbine wheel assembly 24. The track attachment assembly 48 clamps onto a flange 44 of the blade track 42 and is sized to be received in the dovetail slot 54 to couple the blade track 42 to the carrier 34.

The carrier 34 is illustratively attached to the casing 30 and is configured to engage the track retention assembly 48 to support the blade track 42 as suggested in FIG. 2. The carrier 34 illustratively includes a support portion 52 and a carrier portion 50 attached thereto as suggested in FIGS. 2 and 3. The carrier ring 50 illustratively includes a body 36 formed to extend around the axis 20 and track arms 38, 40 that extend inwardly from the body 36 towards the axis 20 as suggested in FIGS. 1-3.

The track arms 38, 40 of carrier 34 are configured to support blade track 42 by connection with flanges 44, 46 of the blade track 42 as suggested in FIGS. 1-3. In illustrative embodiments, the track arms 38 define the dovetail slot 54 in which the track retention assembly 48 is received as suggested in FIGS. 2-6.

The track retention assembly 48 clamps to the blade track 42 to transmit support from the carrier 34 to the blade track 42 as suggested in FIGS. 2 and 3. The track retention assembly 48 is supported by the carrier 34. By supporting the blade track 42 with the carrier 34 through the track retention assembly 48, the resultant support forces transferred to the blade track 42 can be oriented to correspond with the structural geometry of the blade track 42.

Track retention assembly 48 includes retention blocks 78, 79 as illustratively shown in FIG. 4. Each retention block 78, 79 illustratively includes two interior surfaces 76, 77. The interior surface 76 of each retention block 78, 79 illustratively faces away from the axis 20 and towards interior surface 77 of the same retention block 78, 79 as suggested in FIG. 4. The interior surfaces 76 of each retention block 78, 79 are located on one end of their respective retention block 78, 79 such that they are each configured to engage the same exterior surface 74 of the flange 44. The interior surfaces 77 are each located on another end of their respective retention block 78, 79 such that they are each configured to engage the other exterior surface 74 of the flange 44. In illustrative embodiments, each interior surface 76, 77 is slanted to define a rise in the radial direction and run in the circumferential direction, perpendicular to the rise direction as shown in FIG. 3. The interior surfaces 76, 77 thus provide clamped support of the blade track 42.

The blade track 42 includes a runner 64 and the flanges 44, 46 which extend from the runner 64 as suggested in FIG. 2-4. Each flange 44, 46 illustratively extends from the runner 64 in a radial direction away from the axis 20 and generally perpendicular to a top surface of the runner 64 as suggested in FIG. 3. Each flange 44, 46 includes a forward side 66 and an aft side 68, and circumferential sides 70, 72. In illustrative embodiments, each flange 44, 46 has a constant thickness from its forward side 66 to its aft side 68 along its entire radial length as suggested in FIGS. 3 and 4. The circumferential sides 70, 72 of flange 44 define exterior surfaces 74 as suggested in FIG. 4. Each exterior surface 74 is configured to engage with the same one of the interior surfaces 76, 77 of both of the retention block 78, 79 to support the blade track 42.

In illustrative embodiments as suggested in FIGS. 3 and 4, the retention blocks 78 are clamped to the flange 44 of the blade track 42 such that the interior surfaces 76, 77 of the retention blocks 78, 79 engage with the exterior surfaces 74 of the flange 44. As shown in FIG. 3, retention blocks 78, 79 are illustratively embodied as clamped together by bolt 45 the retention blocks 78, 79 and the flange 44 with clearance from the through hole; however in other embodiments the bolt 45 may be omitted. The retention blocks 78 are illustratively disposed within the dovetail slot 54 of carrier 34 as suggested in FIG. 3. In illustrative embodiments, each retention block 78 includes an exterior surface 56 configured to engage with a surface 47 of the track arms 38 of the carrier 34 as suggested in FIGS. 3 and 4.

In illustrative embodiments, each exterior surface 56 of the retention block 78 is slanted to define a rise in the radial direction and run in the circumferential direction, perpendicular to the rise direction as shown in FIG. 3. The run defined by the exterior surface 56 of each retention block 78 is illustratively generally perpendicular to the run defined by the interior surfaces 66, 67 as suggested in FIGS. 3 and 4. The retention blocks 78 cooperate to form a dovetail shape that corresponds to the dovetail slot 54 and is sized to block movement of the track retention assembly out of the dovetail slot 54.

In illustrative embodiments as shown in FIG. 3, the track arms 38, 40 of the carrier 34 include two track arms 38 and two track arms 40 as suggested in FIG. 3. Track arms 38 are illustratively configured to together define the dovetail slot 54 for supporting the flange 44 of the blade track 42. Each track arm 38 illustratively includes the surface 47 that defines a portion of the dovetail slot 54 and is configured for engagement with the exterior surface 56 of the retention block 78 of the track retention assembly 48 as suggested in FIG. 3.

In illustrative embodiments, the two track arms 40 of the carrier 34 are configured to together define a slot 58 for supporting the flange 46 of the blade track 42 as suggested in FIGS. 2-4. Each track arm 40 is illustratively configured for pinned attachment to the flange 46 of the blade track 42 to permit translation of the flange 46 relative to the track arms 40, as suggested in FIG. 3. In illustrative embodiments, each track arm 40 includes three through holes 60 each being configured to receive a pin 62 there through as suggested in FIG. 3. In some embodiments, the carrier and blade track 42 may be configured for attachment to each other in any manner to permit limited translational movement there between, for example, the track arm 40 may include a laterally extending hanger portion configured to provide radial support to a laterally extending portion of flange 46.

Figure 5:
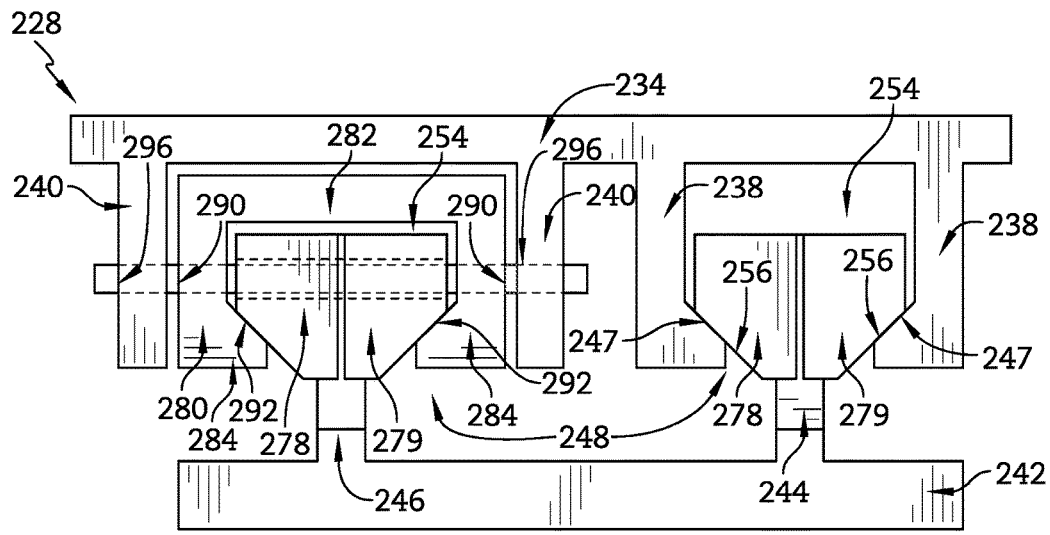
FIG. 5 is a detailed cross-sectional view of a second turbine shroud showing that a carrier includes a dovetail slot on the right side receiving a track retention assembly that includes two retainer blocks that receive a portion of the flange on the right side and block the flange from movement out of the dovetail slot, and another dovetail slot on the left side being pinned for connection with the carrier and receiving a track retention assembly that includes two retainer blocks that receive a portion of another flange on the left side and block the flange.
Figure 6:
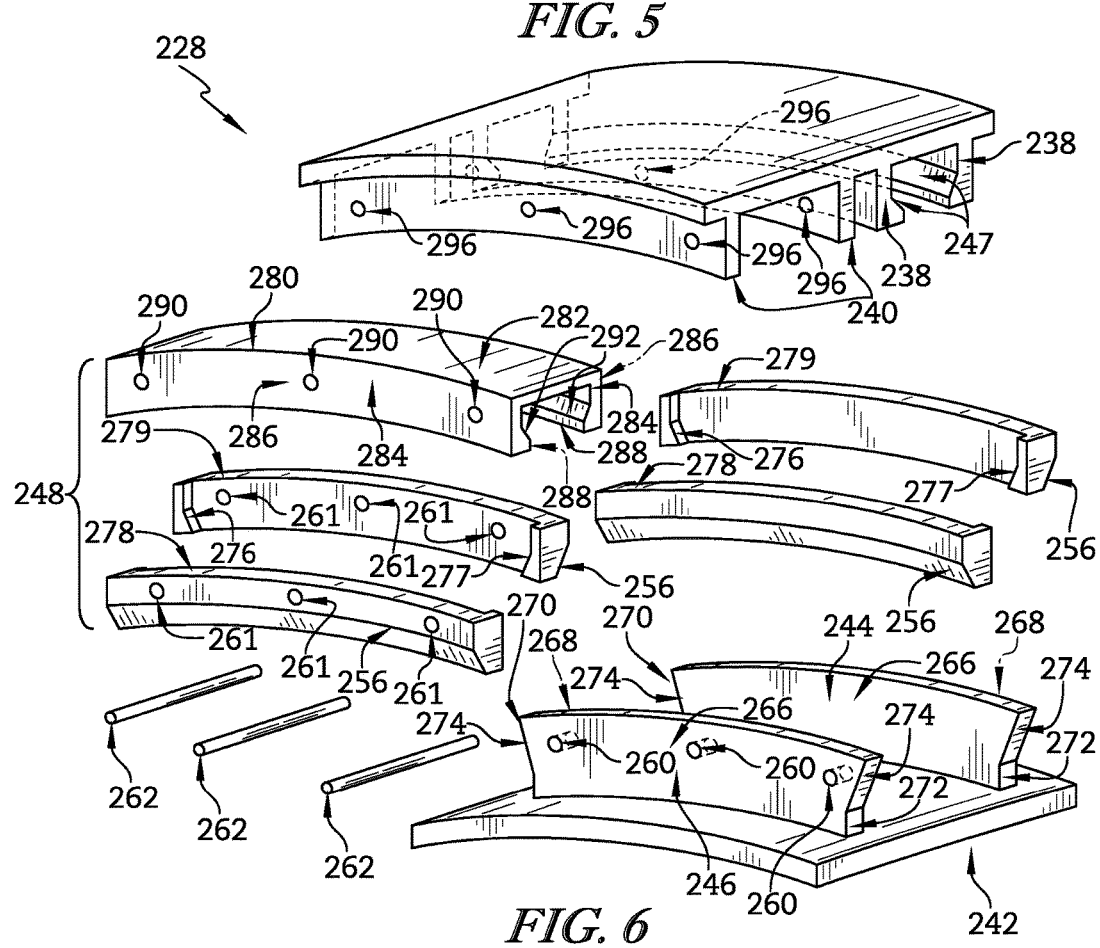
FIG. 6 is an exploded perspective view of the embodiment of FIG. 5 showing that the retainer blocks on the right side include a recess that receives a portion of the flange on the right side, and the retainer blocks on the left side include a recess that receives a portion of the flange on the left side, and showing that each retention block on the right and left sides includes an exterior surface for engaging a surface of the respective right and left side dovetail slots.

A second illustrative turbine shroud 228 adapted for use in the engine 10 is shown in FIGS. 5 and 6. The turbine shroud 228 includes a carrier 234, a blade track 242, and a track retention assembly 248. The carrier 234 comprises a metallic material and provides two dovetail slot 254 for supporting the blade track 242 illustratively comprises a ceramic matrix material and directly surrounds the turbine wheel assembly 224. The track rotation assembly 248 includes blocks 278, 279 that clamp onto a flanges 244, 246 of the blade track 242 and are sized to be received in the dovetail slots 254 to couple the blade track 242 to the carrier 234.

The carrier 234 includes the track arms 238, 240 that are configured to support blade track 242 by connection with flanges 244, 246 of the blade track 242 as suggested in FIGS. 5 and 6. The track arms 238 illustratively define the dovetail slot 254 in which the track retention assembly 248 is received as suggested in FIG. 5. The track retention assembly 248 is configured to clamp to the blade track 242 to transmit support from the carrier 234 to the blade track 242 as suggested in FIGS. 5 and 6. The track retention assembly 248 is supported by the carrier 234. By supporting the blade track 242 with the carrier 234 through the track retention assembly 248, the resultant support forces transferred to the blade track 242 can be oriented to correspond with the structural geometry of the blade track 242.

In illustrative embodiments, the track retention assembly 248 includes four retention blocks 278, 279, as shown in FIGS. 5 and 6. Each retention block 278, 279 illustratively includes two interior surfaces 276, 277. The interior surfaces 276 of each retention block 278, 279 illustratively face away from the axis 20 and towards interior surface 277 of the same retention block 278, 279 as shown in FIG. 6. The interior surfaces 276 of each retention block 278, 279 are located on corresponding ends of their respective retention block 278, 279 such that each is configured to engage the same exterior surface 274 of one of the flanges 244, 246 as suggested in FIG. 5. The interior surfaces 277 of each retention block 278, 279 illustratively face away from the axis 20 and towards interior surface 276 of the same retention block 278, 279 as shown in FIG. 6. The interior surfaces 277 are each located on the other corresponding ends of their respective retention block 278, 279 such that each is configured to engage the other exterior surface 274 of the one of the flanges 244, 246. The interior surfaces 276, 277 of the retention blocks 278, 279 thus are configured to engage the blade track 242 for support by the carrier 234 through the track retention assembly 248.

The track retention assembly 248 includes a dovetail hanger 280 defining a dovetail slot 254 as shown in FIGS. 5 and 6. The dovetail hanger 280 illustratively includes a top 282 and sidewalls 284 extending radially inward from the top 282 as suggested in FIGS. 5 and 6. Each sidewall 284 illustratively includes through holes 290 and an exterior side 286 and an interior side 288 as suggested in FIG. 6. The interior sides 288 each illustratively include an interior surface 292 slanted to face away from the axis 20 and to face toward the interior surface 292 of the interior side 288 of the other sidewall 284 as suggested in FIGS. 5 and 6. The interior surfaces 292 are configured for engagement with the exterior surfaces 56 of one pair of retention blocks 278, 279 to support the blade track 242 with the carrier 234 as suggested in FIGS. 5 and 6.

The dovetail hanger 280 is illustratively configured for pinned attachment to the carrier 234 by pins 262 to permit limited translational movement as suggested in FIGS. 5 and 6. Pins 262 illustratively extend through holes 290 of the dovetail hanger 280 and through holes 296 of the track arms 240. Pins 262 illustratively extend through holes 261 of the one pair of retention blocks 278, 279 and through holes 260 in the flange 246 to provide limited translational movement between the pins 262 and the flange 246 as shown in FIGS. 5 and 6. Holes 260 of flange 246 and holes 261 of the one pair of retention blocks 278, 279 are illustratively larger in diameter than pins 262.

In illustrative embodiments, each exterior surface 256 of the retention blocks 278 are slanted to define a rise in the radial direction and run in the circumferential direction, perpendicular to the rise direction, as shown in FIG. 5. The runs defined by the exterior surfaces 256 of each retention block 278, 279 is illustratively generally perpendicular to the run defined by the interior surfaces 276, 277 as suggested in FIGS. 5 and 6. The retention blocks 278, 279 cooperate to form a dovetail shape that corresponds to a dovetail slot 254 and is sized to block movement of the track retention assembly out of a dovetail slot 254.

Figure 7:
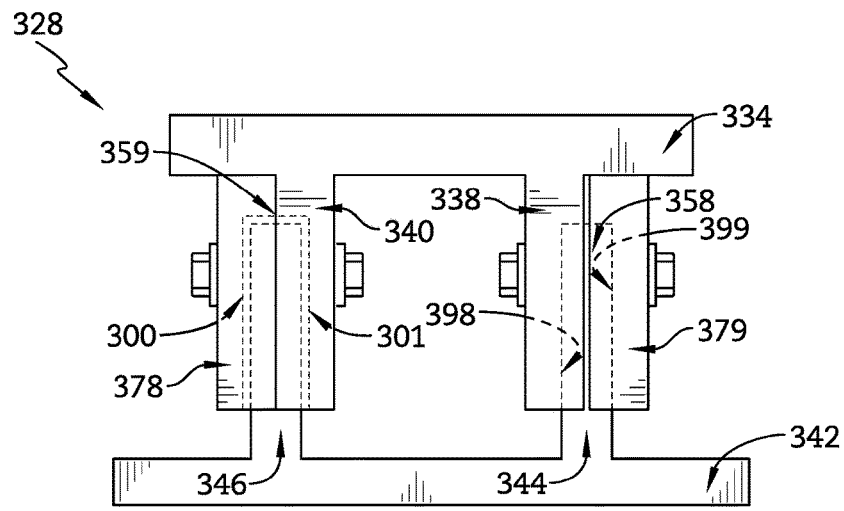
FIG. 7 is a detailed elevation view of a third turbine shroud showing that the turbine shroud includes right and left flanges that are clamped respectively in right and left retention blocks each having bolted connections and showing that the flanges from one side to another side have a constant thickness at each point along a length of the flange that extends outward from the runner.
Figure 8:
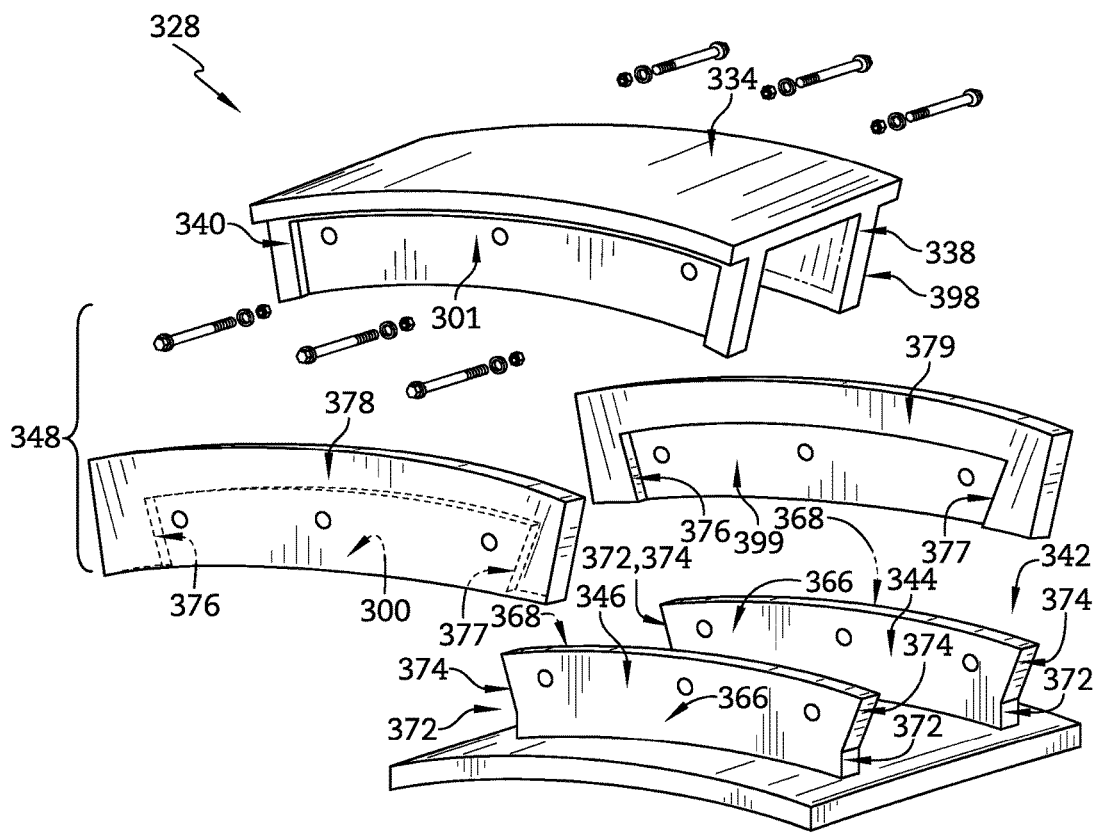
FIG. 8 is perspective view of the embodiment of FIG. 7 showing the upwardly slanted interior surfaces of the right and left clamps are configured for contact with downward slanting surfaces of the flanges.

A third illustrative turbine shroud 328 adapted for use in the engine 10 is shown in FIGS. 7 and 8. The turbine shroud 328 includes a carrier 334, a blade track 342, and a track retention assembly 348. The carrier 334 includes the track arms 338, 340 that are configured to support blade track 342 by connection with flanges 344, 346 of the blade track 342 as suggested in FIGS. 5 and 6. In illustrative embodiments as shown in FIGS. 7 and 8, the track arms 338, 340 are connected to retention blocks 379, 378 respectively to define slots 358, 359 respectively to receive and clamp the flanges 344, 346 respectively of the blade track 342 as shown in FIGS. 7 and 8.

The track retention assembly 348 is configured to clamp the blade track 342 to the carrier 334 as suggested in FIGS. 7 and 8. The track retention assembly 348 is illustratively bolted to the carrier 334 for support as suggested in FIG. 7. By supporting the blade track 342 with the carrier 334 through the track retention assembly 348, the resultant support forces transferred to the blade track 342 can be oriented to correspond with the structural geometry of the blade track 342.

In illustrative embodiments, the track retention assembly 348 includes two retention blocks 378, 379, as shown in FIGS. 7 and 8. Retention blocks 378, 379 are each paired for connection with one track arm 338, 340 respectively. Each track arm 338, 340 includes two interior surfaces 376, 377 as shown in FIG. 8. The interior surfaces 376 of each track arm 338, 340 illustratively face away from the axis 20 and towards the interior surface 377 of the same track arm 338, 340 as suggested in FIG. 8. The interior surfaces 376 of each track arm 338, 340 are located on an end of their respective track arm 338, 340 such that each is configured to engage the same one of the exterior surfaces 374 of one of the flanges 344, 346 as the interior surface 376 of the corresponding retention block 379, 378 as suggested in FIGS. 7 and 8. The interior surfaces 377 of each track arm 338, 340 illustratively face away from the axis 20 and towards the interior surface 376 of the same track arm 338, 340 as shown in FIG. 8. The interior surfaces 377 of each track arm 338, 340 are located on another end of their respective track arm 338, 340 such that each is configured to engage the same other exterior surface 374 of the one of the flanges 344, 346 as the interior surface 377 of the corresponding retention block 379, 378 as suggested in FIGS. 7 and 8. The interior surfaces 376, 377 of the track arms 338, 340 thus are configured to clamp the blade track 342 with a corresponding retention block 379, 378 of the track retention assembly 348 for support by the carrier 334 through the track retention assembly 348.

Each retention block 378, 379 illustratively includes two interior surfaces 376, 377 as shown in FIG. 8. The interior surfaces 376 of each retention block 378, 379 illustratively face away from the axis 20 and towards the interior surface 377 of the same retention block 378, 379 as shown in FIG. 8. The interior surfaces 376 of each retention block 378, 379 are located on an end of their respective retention block 378, 379 such that they are each configured to engage the same one of the exterior surfaces 374 of one of the flanges 344, 346 as the interior surface 376 of the corresponding track arm 340, 338 as suggested in FIGS. 7 and 8. The interior surfaces 377 of each retention block 378, 379 illustratively face away from the axis 20 and towards the interior surface 376 of the same retention block 378, 379 as shown in FIG. 8. The interior surfaces 377 are each located on another end of their respective retention block 378, 379 such that each is configured to engage the other exterior surface 374 of the same one of the flanges 344, 346 as the interior surface 377 of the corresponding track arm 340, 338 as suggested in FIGS. 7 and 8. The interior surfaces 376, 377 of the retention blocks 378, 379 thus are configured to clamp the blade track 342 for support by the carrier 334 through the track retention assembly 348.

In illustrative embodiments as suggested in FIG. 7, the track arm 338 is illustratively connected to the retention block 379 to form the slot 358 and to clamp the flange 344 in such manner that a gap is formed between the track arm 338 and the retention block 379 and such that no appreciable axial spacing exists between each side 366, 367 of flange 344 and interior portions 398, 399 of the track arm 338 and retention block 379 respectively. Track arm 340 is illustratively connected to the retention block 378 to form slot 359 and to clamp the flange 344 in such a manner that no gap remains between the track arm 338 and the retention block 379 and such that some axial spacing exists between each side 366, 367 of flange 346 and interior portions 300, 301 of the track arm 340 and retention block 378 respectively to allow limited translational movement, as suggested in FIGS. 7 and 8. In some embodiments, the carrier 334 and blade track 342 may be configured for attachment to each other in any manner to permit limited translational movement there between, for example, the track arm 340 may include a laterally extending hanger portion configured to provide radial support to a laterally extending portion of flange 346.

In illustrative embodiments, the blade track 42 is formed of ceramic and/or metallic materials and is configured for use in high temperature applications. In some embodiments, the black track 42 is formed of one or more ceramic matrix composite materials including one or more of silicon carbide and oxides of aluminum.

The features of this disclosure may include using thin dovetails such that they can be integral with their flanges within no increase in thickness. Such dovetails may be formed out of a constant thickness flange. Such a dovetail may be formed in place and/or may cut out of a flange after processing into a CMC component. Besides being an inexpensive way of forming dovetails, the features of this disclosure have the advantage of maintaining the attachment loads in plane with the fibers running along the flange to take advantage of the fact that stress allowable in the direction of the fibers is much higher than in the transverse direction (ILT or ILS).

In some embodiments, the dovetail on each flange would fit into a mating pocket of retainer blocks and/or of a carrier. The final assembly can block the flange from movement out of the pocket. In some embodiments, both flanges could utilize such dovetails or one flange could use this type of dovetail while the other flange could be pinned and/or use a traditional hanger and/or other such style which allows movement in the direction between flanges. This can allow for differential thermal growth between the CMC blade track segment and carrier.

In some embodiments, the flanges with dovetails may run in either the axial or circumferential directions relative to the engine centerline. In some embodiments, the loading is along the narrow, angled dovetail surfaces. In some embodiments, the CMC flange dovetail would fit in the same type of pocket, but the pocket would be in one half of a surrounding dovetail. The surrounding dovetail angled surfaces would run perpendicular to the thin flange dovetail. The surrounding split dovetail would then sit in a seat attached to the carrier.

In some embodiments, two halves of the split dovetail may have a slight gap between them in the assembled condition. This gap may fall such that the narrow flange dovetail sits within a pocket on both halves of the surrounding split dovetail. This may necessitate as small of a gap as manufacturing, tolerances, and deflections allow. The benefit of this embodiment is that as the CMC seal segment has load applied, the narrow, flange dovetail will pull down on both halves of the surrounding split dovetail. This load is transferred through the split dovetail into the angled carrier seat. As the split dovetail is loaded into the carrier seat, reaction forces have a component which will push the surrounding split dovetails halves together, against the faces of the narrow, flange dovetail. This reaction load squeezing the flange dovetail may result in a friction force which will carry some of the CMC blade track segment load to the carrier rather than the full load reacting through the narrow, flange dovetail surfaces (which may be limited in area). This arrangement can be capable of carrying higher loads.

In some embodiments, a pin mounting in conjunction may be used to accommodate differential thermal growth between the CMC blade track segment and the carrier during operation. In some embodiments, a dovetail connection sits within a separate piece that is pinned to the carrier. The dovetail seat can translate along the pin during operation to alleviate thermal strains. In some embodiments, the pin passes through (with clearance) both the surrounding split dovetail halves and the narrow flange dovetail. In this way, the pin becomes a safety net in case one of the dovetail features were to fail. In some embodiments, the pin may avoid the surrounding split dovetail halves and narrow flange dovetail. The load in the pin is transferred between the dovetail seat component and the carrier. Moving the sliding joint further away from the CMC permits the joint be optimized to improve life and lower costs. In some embodiments, the sliding joint is metal to metal and may include metal alloys which can be chosen to result in a better wear couple. In some embodiments, arrangement of the joint further from the CMC, may conduct less heat to the sliding joint to improve life and enable material options which may otherwise not be available. Other issues associated with CMC in the sliding joint may be avoided, for example, issues such as embrittlement due to Si diffusion into the metal, coating issues, expensive machining, high wear rates, etc.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A segmented turbine shroud that extends around a central axis, the segmented turbine shroud comprising:
   a carrier segment formed to include a dovetail slot that opens inwardly in a radial direction toward the central axis,
   a blade track segment comprising ceramic-containing materials, the blade track segment being formed to include a runner that extends partway around the central axis and a flange that extends radially outward from the runner, and
   a track retention assembly including retainer blocks that receive at least a portion of the flange included in the blade track segment,
   wherein the retainer blocks are positioned in the dovetail slot of the carrier segment and cooperate to provide a dovetail shape corresponding to the dovetail slot and being sized to block movement of the track retention assembly out of the dovetail slot,
   wherein at least one of the retainer blocks is formed to include a recess that receives at least a portion of the flange of the blade track segment, and
   wherein the flange from one side to another side has a constant cross-sectional thickness at each point along a length of the flange that extends radially outward from the runner.

2. The turbine shroud of claim 1, wherein the recess is formed to match at least a portion of a profile created by the flange.

3. The turbine shroud of claim 1, wherein the recess is formed to match the cross-sectional thickness of the flange.

4. The turbine shroud of claim 1, wherein the retainer blocks are clamped to the flange by a clamp-load device.

5. The turbine shroud of claim 1, wherein the blade track segment includes another flange positioned to be received by at least two other retainer blocks included in the track retention assembly.

6. A segmented turbine shroud that extends around a central axis, the segmented turbine shroud comprising:
   a carrier segment formed to include a dovetail slot that opens inwardly in a radial direction toward the central axis,
   a blade track segment comprising ceramic-containing materials, the blade track segment being formed to include a runner that extends partway around the central axis and a flange that extends radially outward from the runner, and
   a track retention assembly including retainer blocks that receive at least a portion of the flange included in the blade track segment,
   wherein the retainer blocks are positioned in the dovetail slot of the carrier segment and cooperate to provide a dovetail shape corresponding to the dovetail slot and being sized to block movement of the track retention assembly out of the dovetail slot, and
   further including a pin positioned to extend through the retainer blocks.

7. The turbine shroud of claim 6, wherein the pin is positioned to extend through the flange.

8. The turbine shroud of claim 7, wherein the pin extends through radially-elongated apertures formed in the retainer blocks sized to allow movement of the pin in the radial direction.

9. A segmented turbine shroud that extends around a central axis, the segmented turbine shroud comprising:
   a carrier segment formed to include a dovetail slot that opens inwardly in a radial direction toward the central axis,
   a blade track segment comprising ceramic-containing materials, the blade track segment being formed to include a runner that extends partway around the central axis and a flange that extends radially outward from the runner, and
   a track retention assembly including retainer blocks that receive at least a portion of the flange included in the blade track segment,
   wherein the retainer blocks are positioned in the dovetail slot of the carrier segment and cooperate to provide a dovetail shape corresponding to the dovetail slot and being sized to block movement of the track retention assembly out of the dovetail slot,
   wherein the at least two retainer blocks are clamped to the flange by a clamp-load device, and
   wherein the clamp-load device is a threaded fastener that extends through the retainer blocks.

10. A turbine shroud segment comprising:
    a carrier formed to include a dovetail slot,
    a blade track comprising ceramic-containing materials, the blade track segment formed to include a runner and a flange that extends radially outward from the runner, and
    a track retention assembly including two retainer blocks that receive at least a portion of the flange of the blade track, the retainer blocks being positioned in the dovetail slot of the carrier, and that cooperate to provide a dovetail shape corresponding to the dovetail slot and being sized to block radial movement of the track retention assembly radially out of the dovetail slot,
    wherein each retainer block includes an exterior surface configured to engage with a surface of the dovetail slot of the carrier, and an interior surface configured to engage an exterior surface of the flange,
    wherein the exterior surface of at least one of the retainer blocks faces towards the runner of the blade track and at least one of the interior surfaces of the retainer block faces away from the runner of the blade track, and
    wherein the exterior surface of the at least one retainer block is slanted to define a rise and a run, and the interior surface of the at least one retainer block is slanted to define a rise and a run, and a direction of the run of the exterior surface of the at least one retainer block is perpendicular to the direction of the run of the interior surface of the at least one retainer block.

11. A method of assembly of a segmented turbine shroud that extends around a central axis, the method comprising:
    providing a carrier segment formed to include a dovetail slot that opens inwardly in a radial direction toward the central axis,
    providing a blade track segment comprising ceramic-containing materials, the blade track segment formed to include a runner that extends partway around the central axis and a flange that extends radially outward from the runner, and
    providing a track retention assembly including positioning two retainer blocks thereof to receive at least a portion of the flange included in the blade track segment, and positioning the two retainer blocks into the dovetail slot of the carrier segment to cooperate to provide a dovetail shape corresponding to the dovetail slot sized to block radial movement of the track retention assembly radially out of the dovetail slot, wherein each retainer block includes an exterior surface configured to engage with a surface of the dovetail slot of the carrier, and an interior surface configured to engage an exterior surface of the flange, and the exterior surface is slanted to define a slope having a rise and a run, and the interior surface is slanted to define a slope having a rise and a run, and a direction of the run of the slope of the exterior surface is perpendicular to the a direction of the run of the slope of the interior surface.

* * * * *